Oct. 3, 1944.　　　O. M. HARLOW　　　2,359,641
APPARATUS FOR SAMPLING PLANT PRODUCTS
Filed Nov. 26, 1942　　2 Sheets-Sheet 1
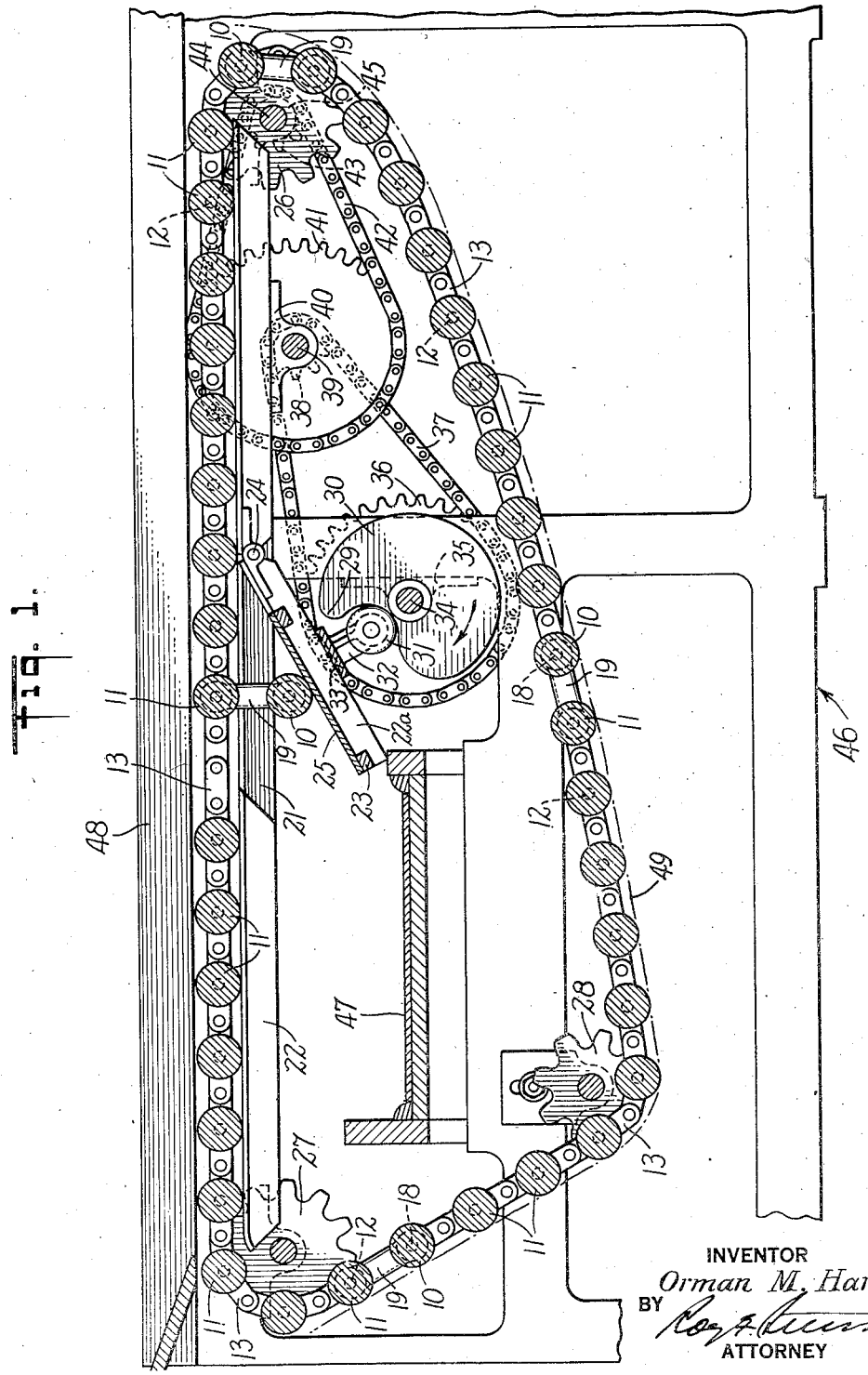
INVENTOR
*Orman M. Harlow*
BY
ATTORNEY

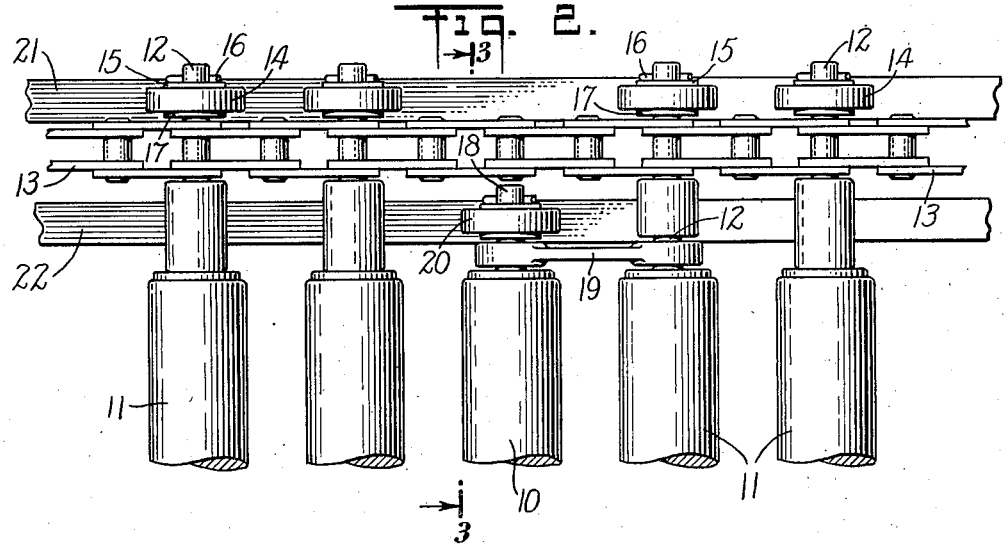
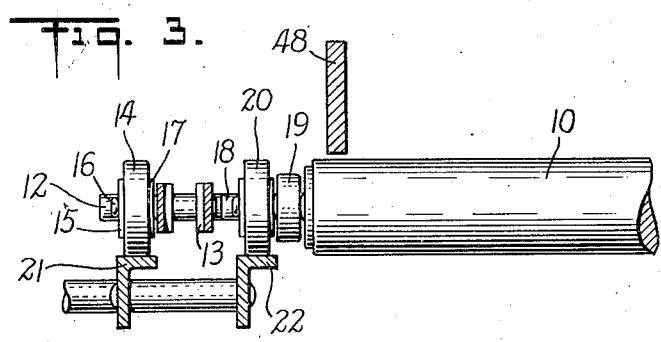
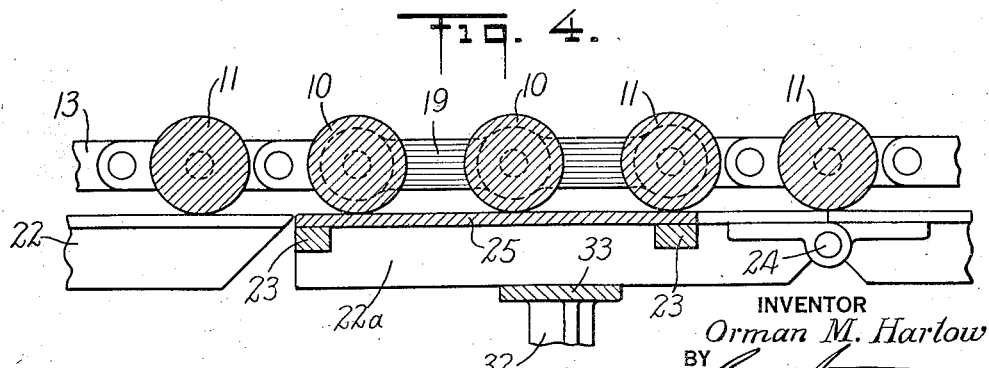

Patented Oct. 3, 1944

2,359,641

UNITED STATES PATENT OFFICE 2,359,641

APPARATUS FOR SAMPLING PLANT PRODUCTS

Orman M. Harlow, Anaheim, Calif., assignor to Brogdex Company, Pomona, Calif., a corporation of California Application November 26, 1942, Serial No. 467,075

7 Claims. (Cl. 73—421)

This invention relates to an apparatus for sampling plant products, and has particular application to the sampling of fruits of generally spheroidal form like citrus fruit, such as oranges, grapefruit and lemons, intended for use in the manufacture of various products therefrom.

In the large-scale commercial handling of citrus and other fruits for market, it has become increasingly usual for a variable proportion of the fruit going through a packing house to be sent by the packer to other plants for working up into by-products or for juice extraction. Fruit thus utilized often consists mainly of culls or other relatively low grades that are difficult or impossible to market satisfactorily as fresh whole fruit. But crop and market conditions sometimes justify diverting much fruit of higher grades to by-product or juice extraction plants, so that a very considerable proportion of the total output of a packing house may sometimes go to such plants. In any case, the value of the fruit for these purposes, and consequently the money return which the owner ought to receive, depend upon such factors, for example, as its percentage of citrus acid content, and the quantity and various specific quality characteristics of its juice content. These factors are usually determined by laboratory tests or assay which, in order to be accurately informative, must be made on a sample that is a truly representative average of the lot of fruit whose value is to be appraised.

The fruit that is to go to the by-products plant is delivered by appropriate conveyor means to large receiving bins, from which quantities may be removed as desired and taken to the by-product plant or plants. Heretofore, in order to obtain the required test sample from a given lot of fruit as it travels in a stream to such a receiving bin, it has been customary to remove manually, at intervals, a few specimens from the stream of fruit in which the given lot to be valued was traveling on a conveyor in being handled, the aggregate of such specimens so collected constituting the same to be submitted to the laboratory for testing. This manual method of sampling is not only tedious and expensive in labor, but is also likely to be misrepresentative because the person doing the sampling may, unintentionally and subconsciously, make a selection of fruit not accurately representative of the lot, so that the resultant aggregate sample is not a fair average. Although this objection has long been recognized, no satisfactory apparatus for automatically sampling given lots of fruit intended to be processed in by-product plants has heretofore been available to the industry.

A principal object of the present invention, therefore, is to provide automatically operating apparatus which will take at regular intervals from the stream of by-product fruit, as it travels to one or another of the receiving bins aforesaid, successive predetermined relatively small quantities of fruit and deposit the same in a separate receptacle to provide the desired aggregate fair average sample of the lot of fruit whose value for by-product purposes is to be appraised.

A further important object of the invention is to provide a sampling apparatus embodying an endless linked conveyor which will not subject the said conveyor to heavy wear such as would result from repeated intermittent changes of load of appreciable amount on the conveyor links or other elements of said conveyor.

A still further object of the invention is to provide an apparatus of the class described which will be simple and economical in construction and operation.

With the above objects in view and some others which will be apparent to those skilled in the art from the description hereinafter, an apparatus embodying the invention comprises an endless conveyor device, to be inserted in the train of conveyor means by which the stream of by-product fruit is conveyed to one of the receiving bins aforesaid; said device having flights or transverse fruit-supporting members, usually rollers, and two double tracks for supporting the upper run of said flights, all but a small section of adjacent flights being supported at each end only on the outer rails of the double tracks while the said small section of adjacent flights has at least one of its flights supported only on the inner rails of the double tracks, the important feature of the invention being that at least one short section of said inner track is arranged to swing downward and then upward, whereby the flight or flights supported by said inner track section is or are dropped quickly to discharge all fruit carried by the section, irrespective of sizes of the individual fruit, and thereafter the angularly movable section is raised to the normal or substantially horizontal position by means independent of the conveyor itself, though working in timed relation to the travel of the conveyor, and advantageously taking energy from the same source that operates the conveyor. In other words, the section of downwardly movable flights is not raised from its dropped position to its normal position by force transmitted through the conveyor itself. Furthermore, the angularly movable track section has its axis of angular movement forward of the free end, with relation to the direction of travel of the upper run of the conveyor so as to give a rapid and extensive drop of the angularly movable section of flights, to discharge quickly, at one point, all the fruit carried or held up by said section of flights.

The accompanying drawings, though somewhat diagrammatic, serve to illustrate in a condensed form the basic principles of the invention.

In the drawings,

Fig. 1 is a longitudinal section of the apparatus;

Fig. 2 is a detail plan view of a portion of the apparatus;

Fig. 3 a transverse section on the line 3—3, Fig. 2, looking in the direction of the arrow; and Fig. 4 a detail view of a modification.

For purpose of explanation, the sampling conveyor is assumed to comprise a plurality of groups of rolls, each group including a plurality of what may be termed normal rolls and one, or a few, downward swinging rolls, as more fully explained hereinafter. The number of normal rolls in a group relative to the downward swinging roll or rolls determines the percentage of samples taken relative to the total amount of fruit carried by the conveyor. In practice it is advantageous to use a multiple of ten rolls in a group, but for the purpose of explanation here, it is assumed that each group comprises only ten rolls. As illustrated in the drawings, one roll of each group, indicated at 10 is arranged to swing downward, to a substantially vertical position beneath the adjacent roll in advance of it when traveling along the upper run of the conveyor. The other nine rolls of each group, some of which are indicated at 11 do not swing downward, but have the normal travel of rolls in the usual endless link-chain roll conveyor.

Each normal roll has a suitable spindle at each end as indicated at 12, these spindles of each roll passing through the pivotal points of coacting links of the endless chain, some of these links being indicated at 13, said spindles having track wheels or rollers 14 on their outer ends. Suitable means for retaining the wheels or rollers 14 on the spindles 12 may be employed, as for example, washers 15 and cotter-pins 16, suitable washers 17 also being placed on the spindles at each side of the corresponding links to prevent undue lateral play of the respective rolls 11.

The roll 10 of each group has a spindle 18 at each end journaled in one end of a radius bar 19, which bar has its other end journaled on the corresponding spindle of the adjacent normal roll 11 which is in advance of the respective roll 10, considered in the direction of forward movement of the upper run of the conveyor.

The spindle 18 of each roll 10 carries a track-wheel or roller 20, outside the radius-bar 19, each wheel being retained on its respective spindle 18 in any suitable way, as for example, by washers and cotter pins.

For supporting the upper run of the conveyor, there is provided a double track, as shown in Figures 2 and 3. The outer track supports the wheels or rollers 14 of the normal rolls, the respective rails forming this outer track being indicated at 21.

The wheels or rollers 20 of the downward swinging rolls 10, are supported along the upper run of the inner track whose rails are indicated at 22. This inner track has a section arranged to swing downward, the rail portions at this section, indicated at 22a, being held apart by cross ties 23 and being pivoted at their forward ends in any suitable way so that when swung up to a normal or horizontal position the movable rail portions will form a part of the inner track so that the track-wheels 20 may pass onto them, and then when swung down quickly as hereinafter explained, the track-wheels 20 will be suddenly lowered, together with the corresponding roll 10, while the companion adjacent normal rolls 11, are still moving forward on the outer tracks. The pivotal axis of the said inner track section is indicated at 24.

If desired the space between the downward swinging rail portions may be covered to form a flat chute surface for a purpose hereinafter explained. If it is to be so covered, a plate or sheet of thin wood, sheet metal or the like, as indicated at 25, may be secured to the top surfaces of the cross-ties 23. In the best embodiment of the invention this plate or sheet may be suitably padded with cloth to avoid undue injury to fruit dropping upon it.

The links 13 are pivotally connected in the usual way to form endless chains passing around a forward pair of sprocket wheels 26 and around a rearward pair of sprocket wheels, 27, these being mounted at opposite ends of the apparatus. If desired, the chains may pass around suitable tension sprocket wheels, to avoid lateral swaying of the lower run of the chains. One such tension sprocket wheel is indicated at 28.

The forward sprocket wheels 26 are driven by suitable means and serve to cause the chains formed by the links, 13, to travel in a forward direction at the upper run, toward the right in Fig. 1, and to carry the fruit to a storage bin or to a transverse conveyor (not shown) which, by adjustment, may deliver the fruit to any selected bin.

An important feature of the invention consists in providing means separate from the conveyor itself for allowing the angularly movable inner track-section to swing from its normal, generally horizontal position of such a position downward that the downwardly movable roll 10, of such section may swing to a position where it is substantially in a vertical line beneath the adjacent forward normal roll 11, for a purpose hereinafter explained, while also this said means serves to lift the angularly movable inner track section back into its normal or substantially horizontal position, at the proper time, these actions taking place without stopping the endless conveyor.

In the best embodiment of the invention, the said means comprises a single cam, indicated at 30, of special configuration acting upon roller 31 carried by a hanger 32 whose base is secured to a plate 33 fixed to the under sides of the rail portions of the movable track section. The said hanger 32 is placed at the longitudinal center of the upper run of the conveyor and the cam is correspondingly located to give an upward thrust in the central longitudinal plane of the said upper run, in order to avoid unnecessary transverse stress on the swinging track section and at the same time avoid the disadvantage of supplying two identical cams, the difficulty of making which will be fully understood by those skilled in the art.

The cam 30 is fixed upon a cam shaft 34, mounted in suitable journals 35 in the machine frame. For the purpose of rotating the cam 30, the shaft 34 is provided with a sprocket wheel 36 fixed on the shaft 34, and driven by a sprocket chain 37 from a driving sprocket wheel 38 fixed on a power shaft 39 supported in journals 40 attached to the machine frame.

The power shaft 39 is also provided with a sprocket wheel 41 which, through a sprocket chain 42, drives a sprocket wheel 43 fixed on a shaft 44 to which the two forward sprocket wheels 26 are fixed. The shaft 44 is mounted in the frame of the machine in any suitable way, as by means of journal boxes one of which is indicated at 45, Figure 1.

The framework of the apparatus may be of any suitable construction and the members thereof are indicated generally at 46.

The operation of the apparatus thus far discussed is as follows:

Power being applied to the power shaft 39 from any suitable source such as an electric motor, not shown, connected to shaft 39 through suitable connections, not shown, the sprocket wheels 39 and 41 are rotated and from them, through the sprocket chains 37 and 42, the forward sprocket wheels 26, and also the sprocket wheel 36 on the cam shaft 34, are rotated.

The endless chains travel forward on the upper run usually in a substantially horizontal direction. Fruit is delivered to the rear or loading end of the upper run of the conveyor in any suitable way as by a chute or conveyor. As this fruit may be of different sizes, the spaces between adjacent rolls 10, 11 of the conveyor must always be less than the minimum dimension of the smallest fruit, in order that none of the latter may fall down between the rolls as they receive their load. The fruit, small and large, drops into the pockets or troughs formed by the spaces between any two adjacent rolls, and is carried toward the forward or discharge end of the apparatus.

All fruit which falls into the troughs between adjacent normal rolls 11 will be carried forward to the front of the apparatus and there discharged from the apparatus and will reach the large bin. All that fruit which falls into the two trough-like spaces on each side of a roll 10 will be retained in said spaces and carried forward up to the point where the track wheels 20 of said roll 10 arrive on the swinging inner track section and are entirely clear of the immovable portion of the inner track. At that instant the cam reaches a position where its cam surface is deeply and steeply recessed to allow the coacting roller 31 to fall quickly and lower the rear end of the angularly movable inner track section, the curvature of the cam surface being such as to allow this quick action without undue shock.

As a result of the downward movement of the rear end of the inner track section, the roll 10 also drops downward while still maintaining contact with the rails of the downward moving inner track section, this downward movement of the roll 10 being in an arc about the pivotal axis of the radius bars 19. By this sudden drop of roll 10, which continues until said roll is substantially vertically under the forward adjacent roll 11 as will be understood from Figure 1, the fruit in the trough-like spaces between said roll 10 and the rear and forward adjacent rolls 11, will be discharged downward from the upper run of the conveyor so quickly as to fall nearly at one spot instead of being unduly scattered along under the apparatus as would occur with a slower movement downward of the movable track section. Where the said track section is covered between the rails with a plate or sheet, as hereinbefore described, the fruit falls gently onto the said plate or sheet and due to the incline of the same, the fruit slides or rolls off the said plate or sheet.

It may slide into a transverse chute or conveyor such as is indicated at 47 from whence it is delivered at one side of the apparatus to a suitable container, usually of sufficient size to receive a plurality of samples and, if desired, of predetermined dimensions to serve as a volume measuring device.

So soon as a sample of fruit is discharged from the angularly movable track section the latter begins to rise to its normal position, not by being dragged up the inclined track section by the conveyor chains, but lifted by the action of the cam, which has a portion of its cam surface of gradually increasing radial dimensions, so that the cam roller 31 rides up this surface without shock and restores the movable track section to its normal position before the next following downwardly movable roll 10 has reached the free rear end of the movable track section. By this construction the work of lifting the movable roll 10 back to normal position is not thrown on the link-chains of the conveyor, and hence, heavy wear on the pivotal connections of the link-chains is avoided. At the same time the positive connections between the power shaft, the forward sprocket wheels, and the cam shaft maintain the cam in proper timed relation to the travel of the conveyor, so that the movable track section will fall and rise at the proper time when it is reached by a movable roll 10.

While the discharge of fruit from two trough-like spaces, one on each side of a movable roll 10, will generally be sufficient to give a fair average of the fruit which is being sampled, it is obvious that the size of the sample may be increased by providing the apparatus with a plurality of rolls mounted in each pair of radius bars, for example, two rolls as indicated in the detail view Figure 4. In this modification there will be three trough-like spaces formed between the downwardly movable rolls 10 and the adjacent normal rolls 11, to receive fruit and discharge it from the conveyor.

While the appartus shown and described has several groups of rolls, each comprising nine normal rolls and one movable roll, it is obvious that the ratio of normal rolls to movable rolls may be varied somewhat if necessary to differently proportion the ratio of sample fruit to the fruit delivered to the large bins.

Furthermore, it may be sufficient in some cases to use only one movable roll 10 in the entire endless conveyor, whereby the ratio of the volume of the sample taken to the volume of the fruit delivered to the large bin will be a minimum.

As in the usual endless chain conveyor, suitable guide boards are employed to retain the fruit on the upper run of the conveyor, as indicated at 48, Figs. 1 and 3.

In the apparatus illustrated in the drawings there are forty rolls, thus providing in turn forty trough-like spaces for holding fruit, only those on the upper run of the conveyor being in proper position to support such fruit. If there are four groups of rolls of ten each and one of each group is movable downward, there will be four movable rolls in the whole conveyor ready to discharge fruit when arriving at the movable track section. As each movable roll will, when moved downward, discharge the fruit from two trough-like spaces, as hereinbefore explained, there will be eight groups of fruit, that is eight samples discharged at each circuit of the endless conveyor, or one-fifth of the total amount of fruit arriving on the conveyor in one circuit. Hence, the samples will constitute twenty percent of the total amount of the fruit coming onto the conveyor or twenty-five percent of the fruit discharged to the bin.

It is relatively easy to replace movable rolls 10 with normal rolls 11, and by this operation the percentage of fruit removed in the samples may be correspondingly changed. For example, with only one movable roll 10, in the endless conveyor of forty rolls, there will be two troughs discharged at each cyclic movement of the conveyor or five percent of the total fruit arriving on the conveyor; with two movable rolls, ten percent; with three movable rolls, fifteen percent; and as heretofore stated, with four movable rolls, twenty percent.

The removal of some of the movable rolls 10 and their replacement by normal rolls supported by the outer track does not necessitate any change in the cam mechanism or the driving mechanism since the downward movement of the movable section of the inner track cannot cause a discharge of a fruit sample except when a movable roll 10 arrives at such movable section. In other words with only one movable roll in a sampling machine having forty rolls, there are three idle turns of the cam and only one turn which results in the discharge of a sample.

In the best embodiment of the invention, the peripheral cam surface, which coacts with the cam roller, is arranged to very gradually start the movable inner track section downward at first so that the fruit in the trough-like space at the rear of the downward movable roll 10 is allowed to slide downward gradually as the space between the said roll 10 and the rear adjacent normal roll 11 increases, so that the fruit therein does not have so far to drop, to reach the surface of the plate or sheet, which forms a chute wall or deflector carried by the movable section of the inner track. The fruit in the trough in advance of the said roll 10 slips over the top of said roll as the latter swings down, so that the final free fall to the said plate or sheet is reduced. To obtain the desired initial slow action of the cam its corner between the portion which is of circular form and the portion which quickly reduces in radius is rounded off as shown at 29 in Fig. 1 of the drawings.

If desired, the lower run of the chain may be supported by tracks in the usual way, the lower inner track being extended far enough at each end to sustain the downward moving rolls as they leave the forward sprocket wheels 26 and to guide them to the rear sprocket wheels 27. This prevents the radius bars 19 and the rolls 10 from swinging downward as the rolls 10 pass around the front sprocket wheels. Such tracks are indicated in dotted line at 49, Fig. 1.

A great advantage of applicant's invention is that the samples discharged from the apparatus described may be conveyed to a second duplicate machine and there again sampled. If, for example, the first operation select samples constituting five per cent of the fruit going to the first machine, the use of a second duplicate machine working on product discharge from the first machine will give one twentieth of said 5 per cent of ¼ of one per cent of the total fruit sent to the first machine. By the use of two machines in series, with the proper selection of the ratio of normal rolls to downward dropping rolls, any usual percentage of sample may be taken. Of course, instead of using two machines, the samples derived from the first machine may be run back through said first machine when it is not working directly on fruit traveling to the receiving bins.

What is claimed is:

1. In an apparatus for sampling fruit, the combination, with an endless conveyor comprising transverse fruit-supporting members and having a movable fruit-supporting section arranged to swing angularly downward, from the upper run of the conveyor and then upward to its place therein, about a transverse axis forward of the free end of said section, and means for driving said endless conveyor, of a rotary cam, means supporting the movable section and coacting with the cam, whereby said movable section of the conveyor is permitted to swing downward and drop all its fruit at a predetermined point in the travel of the upper run of the conveyor and thereafter is positively driven upward to its normal position in the upper run of the conveyor, and means for rotating said cam in timed relation to the travel of the conveyor.

2. In an apparatus for sampling fruit, the combination, with a pair of stationary rails forming an outer track, a pair of inner rails inside of, parallel to and coextensive with the outer rails, to form an inner track, a section of said inner track being mounted for angular movement downward from the normal level and then upward thereto, about an axis forward of the free end of said section, said movable track section having cam-engaging means, a series of normal transverse fruit-supporting members mounted on wheels running on the outer track, endless chains connected to said normal fruit-supporting members for moving them along the track, at least one of said normal fruit-supporting members carrying the pivotal ends of a pair of angularly movable radius bars, and a fruit-supporting member for each pair of radius bars, connected to the free ends thereof and mounted on wheels running on the inner track, of a rotary cam-mechanism arranged to make contact with the cam-engaging means of the movable track section to cause the downward and upward angular movement of the movable section of the inner track, two pairs of link-chain sprocket wheels, one pair at each end of the tracks around which sprocket wheels the respective endless chains pass, and means for driving at least one pair of said sprocket wheels and the rotary cam-device in predetermined timed relation to each other, whereby fruit supported by the fruit-supporting members in their travel along the tracks will have a sample discharged downward by the downward swinging of the movable inner track section and that remainder carried wholly by the normal rolls will be discharged at the forward end of the tracks.

3. In an apparatus for sampling fruit, the combination, with a pair of stationary rails forming an outer track, a pair of inner rails inside of, parallel to and coextensive with the outer rails, to form an inner track, a section of said inner track being mounted for angular movement downward and rearward from the normal level and then upward thereto, about an axis forward of the free end of said section, a series of normal transverse fruit-supporting members mounted on wheels running on the outer track, endless chains connected to said normal fruit-supporting members for moving them along the track, at least one of said normal fruit-supporting members carrying a pair of angularly movable radius bars at each end, and a fruit-supporting member for each pair of radius bars, connected to the free ends thereof and mounted on wheels running on the inner track, of a rotary cam, a cam-roller mounted on the movable section of the inner track and coacting with the cam to determine the downward and upward angular movement of the movable section of the inner track, two pairs of linkchain sprocket wheels, one pair at each end of the tracks around which sprocket wheels the respective endless chains pass, and means for driving at least one pair of said sprocket wheels and the rotary cam in predetermined timed relation to each other, whereby fruit supported by the fruit-supporting members in their travel along the tracks will have a sample discharged downward by the downward swinging of the movable inner track section and the remainder discharged at the forward end of the tracks.

4. In an apparatus for sampling fruit and similar plant products, the combination, with a pair of rails forming an outer track, a pair of rails forming an inner track, a section of said inner track being mounted for angular movement downward from the normal level and then upward thereto about an axis forward of the free end of said movable inner track section, a series of transverse fruit-supporting members, including a movable section thereof mounted for angular movement downward from the normal level and then upward thereto about an axis forward of the free end of said movable fruit-supporting section, said movable fruit-supporting section being supported by the inner track, and the remaining fruit-supporting members being supported by the outer track, and means for moving said fruit-supporting members along said tracks, of means for intermittently lowering and lifting the movable inner track-section, whereby the movable fruit-supporting section is dropped to discharge fruit carried by it and then lifted to its normal position, and connections between said means for moving the fruit-supporting sections along the track and said means for lowering and lifting the movable inner track section, whereby they operate in timed relation to each other.

5. In an apparatus for sampling fruit and similar plant products, the combination, with an endless conveyor comprising transverse fruit-supporting members and having a fruit-supporting section arranged to swing angularly downward from its normal position in the upper run of the conveyor and then upward to its said normal position about a transverse axis forward of the free end of said section, an inner track for the upper run of the conveyor arranged to support the angularly movable fruit-supporting section, said inner track having a movable section mounted for angular movement downward from the normal level of the upper run and then upward thereto, about an axis forward of the free end of the track section, and an outer track supporting the remainder of said fruit-supporting members, of means for driving said endless conveyor, means for intermittently lowering and lifting the movable inner track section, and connections between said conveyor driving means and such movable track-section lowering and lifting means, whereby they operate in timed relation to each other.

6. In an apparatus for sampling fruit, the combination, with an endless conveyor comprising transverse fruit-supporting members and having a movable fruit-supporting section arranged to swing angularly downward and then upward to its normal fruit supporting position in the upper run of the conveyor, about a transverse axis forward of the free end of said section, and means for driving said endless conveyor, of a track along which the movable fruit-supporting section travels at the upper run of the conveyor, said track having a movable section mounted for lowering and lifting, a separate track along which the remaining fruit-supporting sections travel at the upper run of the conveyor, and means for driving the endless conveyor, of a second means for intermittently lowering and lifting the movable track section, and connections between the means for driving the endless conveyor and the means for lowering and lifting the movable track section, whereby they operate in timed relation to each other.

7. In an apparatus for sampling fruit the combination, with an endless conveyor comprising transverse fruit-supporting members and having a movable fruit-supporting section arranged to swing angularly downward, from the upper run of the conveyor and then upward to its place therein, about a transverse axis forward of the free end of said movable section, means including an angularly movable portion supporting said movable fruit-supporting section said angularly movable portion being arranged to swing about a transverse axis forward of its free end, said angularly movable portion having a closed surface to serve as a chute wall for deflecting fruit when said movable supporting portion is inclined downward, and means for actuating the endless conveyor to cause it to transport fruit along its upper run, of means for intermittently lowering and lifting the angularly movable supporting portion, and connections between the conveyor actuating means and the lowering and lifting means whereby they operate in timed relation to each other.

ORMAN M. HARLOW.